US010457288B2

(12) United States Patent
Takayanagi et al.

(10) Patent No.: US 10,457,288 B2
(45) Date of Patent: Oct. 29, 2019

(54) STRADDLED VEHICLE

(71) Applicant: YAMAHA HATSUDOKI KABUSHIKI KAISHA, Iwata-shi, Shizuoka-ken (JP)

(72) Inventors: Tomokazu Takayanagi, Shizuoka (JP); Joji Sawaoka, Shizuoka (JP); Kazuyuki Maeda, Shizuoka (JP); Kosuke Hirata, Shizuoka (JP); Naoki Kitamura, Shizuoka (JP)

(73) Assignee: YAMAHA HATSUDOKI KABUSHIKI KAISHA, Iwata-Shi, Shizuoka-Ken (JP)

( * ) Notice: Subject to any disclaimer, the term of this patent is extended or adjusted under 35 U.S.C. 154(b) by 0 days.

(21) Appl. No.: 15/988,121

(22) Filed: May 24, 2018

(65) Prior Publication Data

US 2018/0345970 A1 Dec. 6, 2018

(30) Foreign Application Priority Data

Jun. 2, 2017 (JP) .................. 2017-110486

(51) Int. Cl.
*B60W 30/182* (2012.01)
*B60W 30/18* (2012.01)
(Continued)

(52) U.S. Cl.
CPC .......... *B60W 30/182* (2013.01); *B60L 50/16* (2019.02); *B60W 10/02* (2013.01); *B60W 20/40* (2013.01);
(Continued)

(58) Field of Classification Search
USPC ........................................................ 701/22
See application file for complete search history.

(56) References Cited

U.S. PATENT DOCUMENTS 4,126,200 A * 11/1978 Miller .................... B60K 6/105
123/192.2
4,255,789 A * 3/1981 Hartford ............... F02D 41/263
123/406.65
(Continued)

FOREIGN PATENT DOCUMENTS

EP 1070964 A2 * 7/1999
EP 2070964 A2 * 1/2001
(Continued)

OTHER PUBLICATIONS

JPH085427B2 english translation from google patents (Nov. 30, 2018).*
(Continued)

*Primary Examiner* — Jean Paul Cass
(74) *Attorney, Agent, or Firm* — Rabin & Berdo, P.C.

(57) ABSTRACT

A motorcycle includes an engine that generates a driving force during a normal traveling mode, and a vehicle driving motor that generates a driving force for moving a vehicle main body forward and backward during an auxiliary moving mode. A traveling speed of the vehicle main body is detected by a speed sensor, and the detected traveling speed is presented to the rider by a speedometer. A rotation speed of the vehicle driving motor or a rotation speed of a gear rotated by the vehicle driving motor is detected by a rotation speed sensor as a physical quantity that changes depending on a moving speed of the vehicle main body during the auxiliary moving mode. The vehicle driving motor is controlled based on the detected rotation speed such that the moving speed of the vehicle main body is close to or coincides with a target speed.

11 Claims, 7 Drawing Sheets

(51) Int. Cl.
  *B60W 10/02* (2006.01)
  *B60W 20/40* (2016.01)
  *B60L 50/16* (2019.01)

(52) U.S. Cl.
  CPC .... *B60W 30/18036* (2013.01); *B60L 2200/12* (2013.01); *B60W 2300/36* (2013.01); *B60Y 2200/12* (2013.01)

(56) References Cited

U.S. PATENT DOCUMENTS

| | | | | | |
|---|---|---|---|---|---|
| 4,763,538 | A | * | 8/1988 | Fujita | B62K 23/06 123/179.25 |
| 4,827,148 | A | * | 5/1989 | Hirosawa | F02N 11/08 290/38 R |
| 4,869,332 | A | * | 9/1989 | Fujita | B62M 23/00 180/65.22 |
| 5,068,583 | A | * | 11/1991 | Gresham | F16H 59/70 318/266 |
| 5,223,774 | A | * | 6/1993 | Ikeda | G05B 19/416 318/268 |
| 5,378,822 | A | * | 1/1995 | Bradfield | C07K 14/395 536/23.1 |
| 5,644,200 | A | * | 7/1997 | Yang | B60K 6/38 318/139 |
| 5,886,504 | A | * | 3/1999 | Scott | B23K 9/1062 322/15 |
| 6,054,826 | A | * | 4/2000 | Murakami | B60L 3/04 318/434 |
| 6,082,084 | A | * | 7/2000 | Reimers | A01D 69/02 56/11.9 |
| 6,457,381 | B1 | * | 10/2002 | Nonaka | B60K 31/042 74/342 |
| 2002/0030601 | A1 | * | 3/2002 | Yano | B62J 1/12 340/667 |
| 2003/0038437 | A1 | * | 2/2003 | Ungvari | B62H 1/12 280/79.4 |
| 2004/0040756 | A1 | * | 3/2004 | Nmngani | B62D 37/06 180/6.2 |
| 2007/0068790 | A1 | * | 3/2007 | Yerdon | H03K 17/962 200/600 |

FOREIGN PATENT DOCUMENTS

| | | | |
|---|---|---|---|
| JP | H10-329781 A | | 12/1998 |
| JP | H11-078554 A | | 3/1999 |
| JP | 2005233622 A | * | 9/2005 |
| JP | 3731163 B1 | | 1/2006 |
| JP | 2006-051853 A | | 2/2006 |
| JP | 2010-120597 A | | 6/2010 |
| JP | 2011-031837 A | | 2/2011 |
| JP | 2012-162095 A | | 8/2012 |
| JP | 2013-035430 A | | 2/2013 |
| JP | 2014-108636 A | | 6/2014 |
| JP | 2016-037255 A | | 3/2016 |
| JP | 6002166 B2 | | 10/2016 |

OTHER PUBLICATIONS

EP1070964A2 to Ing english translation (Nov. 30, 2018).*
JP2005233622A to Adachi et al. english translation (Nov. 30, 2018).*

* cited by examiner

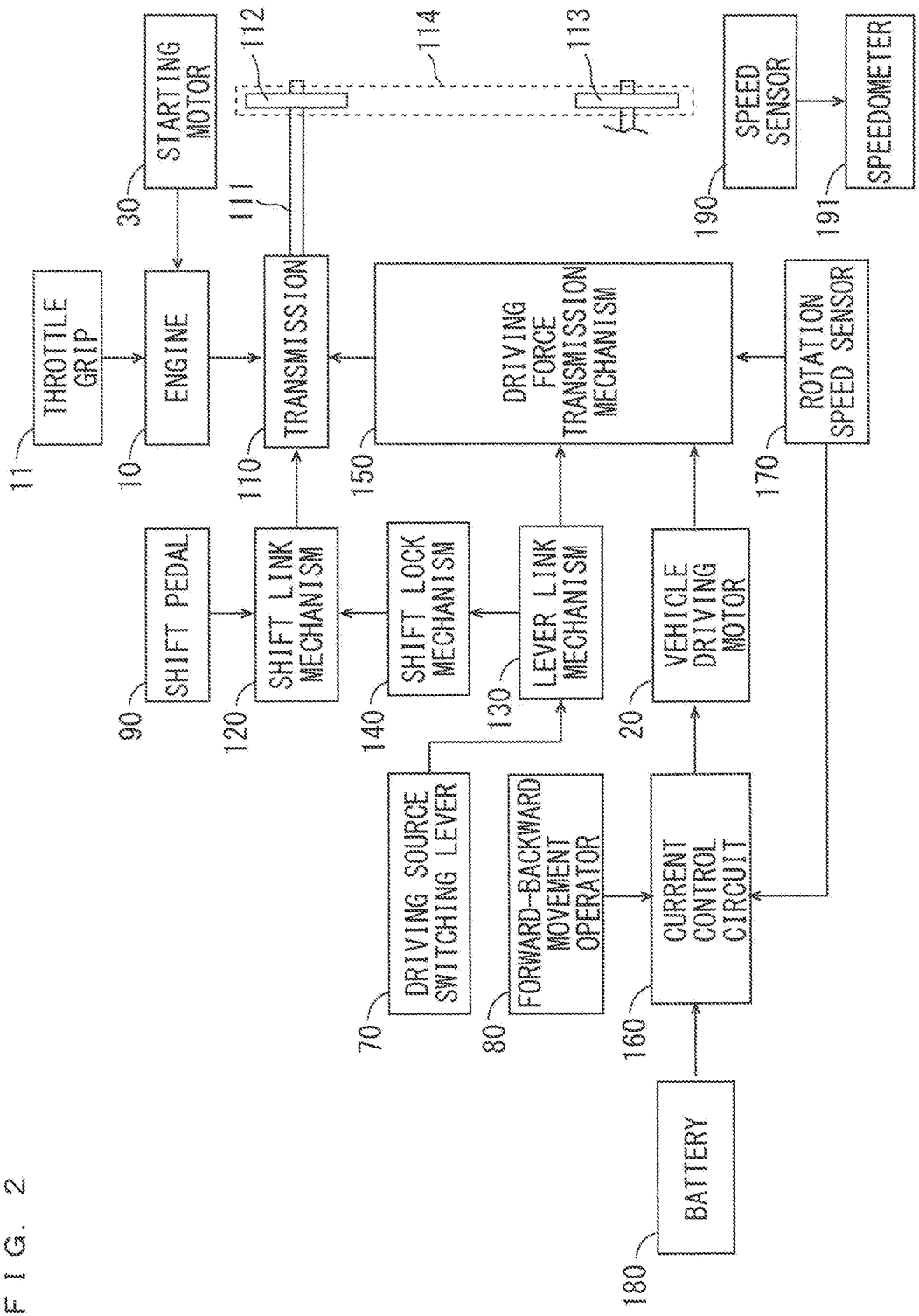
F I G. 2

STRADDLED VEHICLE

BACKGROUND OF THE INVENTION

Field of the Invention

The present invention relates to a straddled vehicle that can move forward and backward at a low speed.

Description of Related Art

When a rider parks a motorcycle, it is necessary to move the motorcycle at a low speed. Conventionally, a motorcycle, which can be easily operated so as to move forward or backward at a low speed, has been developed. For example, a motorcycle described in JP 10-329781 A can move forward or backward by a driving force of an assist motor.

SUMMARY OF THE INVENTION

When the rider attempts to move the motorcycle described in JP 10-329781 A on a slope at a low speed, a moving speed of the motorcycle changes according to a degree of inclination. In particular, in the case where the rider parks the motorcycle in a small space or moves the motorcycle in a small space, when the moving speed of the motorcycle changes, it is difficult for the rider to operate the motorcycle.

An object of the present invention is to provide a straddled vehicle that can be easily moved at a low speed regardless of a state of a ground surface.

(1) A straddled vehicle according to one aspect of the present invention includes a vehicle main body, a first driving source that generates a driving force for a forward movement of the vehicle main body based on an operation of a rider during a normal traveling mode, a second driving source that generates a driving force for forward and backward movements of the vehicle main body based on an operation of the rider during an auxiliary moving mode, a speed detector that detects a traveling speed of the vehicle main body, a speed presenter that presents the traveling speed detected by the speed detector to the rider, a physical quantity detector that is provided separately from the speed detector, and detects a physical quantity that changes depending on a moving speed of the vehicle main body during the auxiliary moving mode, and a driving controller that controls the second driving source based on the physical quantity detected by the physical quantity detector during the auxiliary moving mode such that the moving speed of the vehicle main body is close to or coincides with a target speed that is equal to or lower than a predetermined value.

In the straddled vehicle, during the normal traveling mode, the vehicle main body moves forward by the driving force generated by the first driving source based on the operation of the rider. At this time, the traveling speed of the vehicle main body detected by the speed detector is presented to the rider. During the auxiliary moving mode, the vehicle main body moves forward or backward by the driving force generated by the second driving source. Here, the physical quantity detector is provided separately from the speed detector. Therefore, resolving power of the physical quantity detector can be increased independently from the function required of the speed detector during the normal traveling mode. In this case, the physical quantity that changes depending on the moving speed of the vehicle main body is accurately detected, and the second driving source is controlled based on the detected physical quantity such that the moving speed of the vehicle main body is close to or coincides with the target speed that is equal to or lower than the predetermined value. Therefore, the motorcycle can be easily moved at a low speed regardless of a state of the ground surface.

(2) The predetermined value may be an average speed of a walking person.

In this case, during the auxiliary moving mode, the vehicle main body moves at a target speed that is lower than the average speed of a walking person. Thus, the rider can easily move the straddled vehicle forward and backward in a small space.

(3) The physical quantity detector may include a rotation speed detector that detects a rotation speed of the second driving source or a rotation speed that is proportional to the rotation speed of the second driving source, and the driving controller may calculate the moving speed of the vehicle main body based on the rotation speed detected by the rotation speed detector.

In this case, the moving speed of the vehicle main body is calculated based on the rotation speed detected by the rotation speed detector. The second driving source can be accurately controlled based on the calculated moving speed.

(4) The straddled vehicle may further include a drive wheel rotatably provided at the vehicle main body, and a reduction gear that is provided in a motive power transmission path from the second driving source to the drive wheel, wherein the rotation speed detector may detect a rotation speed that is higher than a rotation speed of the drive wheel in the reduction gear.

In this case, when the drive wheel is rotating at a low speed, the high rotation speed can be detected. Thus, the rotation speed detector can accurately detect the rotation speed.

(5) A driving force generated by the first driving source may be transmitted to the drive wheel through a motive power transmission path through a motive power transmission path, and the motive power transmission path from the first driving source to the drive wheel and the motive power transmission path from the second driving source to the drive wheel may have a merging portion that is connected to the drive wheel, and the rotation speed detector may detect a rotation speed in a portion from the second driving source to the merging portion of the reduction gear.

In this case, a higher rotation speed can be detected. Thus, the rotation speed detector can detect the rotation speed more accurately.

(6) The second driving source may include an electric motor.

In this case, during the auxiliary moving mode, the vehicle main body can be moved at the target speed by electric control.

(7) The driving controller may include a current control circuit that controls a current supplied to the electric motor based on a physical quantity detected by the physical quantity detector.

In this case, during the auxiliary moving mode, the vehicle main body can be moved at the target speed by current control.

(8) The current control circuit may include a plurality of current paths connected to the electric motor, a plurality of switches that are provided in the plurality of current paths, and a switch controller that performs switching on and off of the switches, wherein the switch controller may control a current supplied to the electric motor by selectively switching on or off one or a plurality of switches based on the physical quantity detected by the physical quantity detector.

In this case, it is possible to easily control the current supplied to the electric motor by switching on and off of the plurality of switches.

(9) The switch controller may allow a first number of switches out of the plurality of switches to be switched on when the moving speed of the vehicle main body is equal to or higher than a preset lower limit value, and may allow a second number, that is larger than the first number, of switches to be switched on when the moving speed of the vehicle main body is lower than the lower limit value.

In this case, the moving speed of the vehicle main body can be brought close to the target speed quickly when the ground surface is inclined upward in a moving direction of the vehicle main body.

(10) The switch controller may shift switching time points at which the plurality of switches are switched on and off from one another on a time axis.

In this case, a sudden change of the moving speed of the vehicle main body is inhibited.

(11) The driving controller may allow dynamic braking of the electric motor to be performed when a moving speed calculated based on a physical quantity detected by the physical quantity detector is equal to or larger than a preset upper limit value.

In this case, the moving speed of the vehicle main body can be brought close to the target speed quickly when the ground surface is inclined downward in a moving direction of the vehicle main body.

Other features, elements, characteristics, and advantages of the present invention will become more apparent from the following description of preferred embodiments of the present invention with reference to the attached drawings.

BRIEF DESCRIPTION OF THE DRAWINGS

FIG. 2 is a schematic diagram showing configurations of a motive power transmission system and an electric control system of the motorcycle of FIG. 1;

DETAILED DESCRIPTION

A straddled vehicle according to embodiments of the present invention will be described below with reference to drawings. In the following description, a motorcycle is described as one example of the straddled vehicle.

(1) Schematic Configuration of Motorcycle

Figure 1:
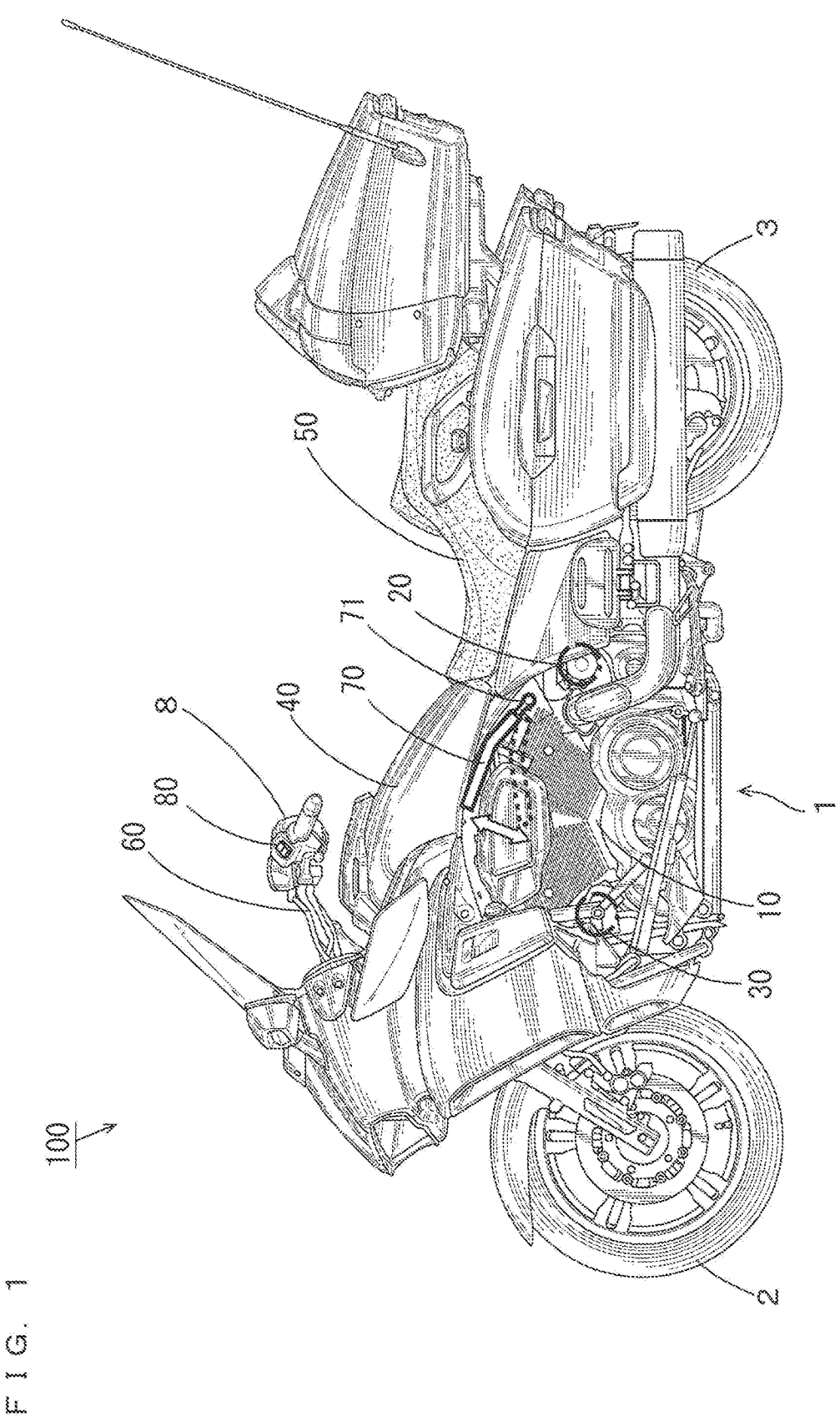
FIG. 1 is a side view of a motorcycle according to one embodiment of the present invention.

FIG. 1 is a side view of the motorcycle according to one embodiment of the present invention. In FIG. 1, the motorcycle 100 standing up to be perpendicular to the road surface is shown.

A front wheel 2 and a rear wheel 3 are rotatably provided at a vehicle main body 1 of the motorcycle 100 of FIG. 1. The vehicle main body 1 includes a V-type engine 10, a vehicle driving motor 20 and a starting motor 30. The vehicle driving motor 20 and the starting motor 30 are electric motors operated by electric power. A fuel tank 40 is arranged above the engine 10, and a seat 50 is arranged at a position farther rearward than the fuel tank 40.

A driving source switching lever 70 is provided below the fuel tank 40. As indicated by an outlined arrow, the driving source switching lever 70 is attached to a shaft 71 to be swingable upward and downward. The rider operates the driving source switching lever 70 to selectively switch an operation mode of the motorcycle 100 between a normal traveling mode and an auxiliary moving mode. In the normal traveling mode, the motorcycle 100 travels by a driving force generated by the engine 10. In the auxiliary moving mode, the motorcycle 100 moves forward or backward at a substantially constant low speed by a driving force generated by the vehicle driving motor 20.

With a front end of the driving source switching lever 70 in close proximity to a lower edge of the fuel tank 40, the operation mode is set to the normal traveling mode. During the normal traveling mode, normally, the rider is seated on the seat 50 and places his or her legs forward and downward. At this time, the front end of the driving source switching lever 70 is located in an upper position, so that the rider's leg is unlikely to come into contact with the driving source switching lever 70. With the front end of the driving source switching lever 70 spaced apart downward from the lower edge of the fuel tank 40, the operation mode is set to the auxiliary moving mode. During the auxiliary moving mode, the rider is seated on the seat 50 and places his or her legs substantially vertically with respect to the road surface. Therefore, the rider's leg does not come into contact with the driving source switching lever 70.

Hereinafter, a state of the driving source switching lever 70 for setting the operation mode to the normal traveling mode is referred to as an engine driving state, and a state of the driving source switching lever 70 for setting the operation mode to the auxiliary moving mode is referred to as a motor driving state. A forward movement of the motorcycle 100 during the normal traveling mode by a driving force of the engine 10 is referred to as traveling. Forward or backward movements of the motorcycle 100 at a low speed during the auxiliary moving mode by a driving force of the vehicle driving motor 20 is referred to as moving. Further, a speed at which the motorcycle 100 moves forward during the normal traveling mode is referred to as a traveling speed, and a speed at which the motorcycle 100 moves forward or backward during the auxiliary moving mode is referred to as a moving speed.

A handle 60 is provided at a position farther forward than the fuel tank 40. An operation unit 8 is provided at the handle 60. The operation unit 8 includes a forward-backward movement operator 80. The rider operates the forward-backward movement operator 80 in order to switch the movement of the motorcycle 100 between forward and backward movements in the auxiliary moving mode.

(2) Configurations of Motive Power Transmission System and Electric Control System FIG. 2 is a schematic diagram showing the configurations of the motive power transmission system and the electric control system of the motorcycle 100 of FIG. 1.

In FIG. 2, the starting motor 30 is used to rotate a crankshaft of the engine 10 during the start-up of the engine 10. The rider adjusts a rotation speed of the engine 10 by operating a throttle grip 11 during the normal traveling mode.

When the operation mode is set to the normal traveling mode by the driving source switching lever 70, a driving force of the crankshaft of the engine 10 is transmitted to a driving shaft 111 via a transmission 110. A driving sprocket 112 is attached to the driving shaft 111. A driven sprocket 113 is attached to the rear wheel 3 of FIG. 1. A chain 114 is wound around the driving sprocket 112 and the driven sprocket 113. During the normal traveling mode, a driving force of the engine 10 is transmitted to the rear wheel 3. An operation of a shift pedal 90 is transmitted to the transmission 110 by a shift link mechanism 120. Thus, a shift position of the transmission 110 is changed.

The state of the driving source switching lever 70 is transmitted to a shift lock mechanism 140 and a driving force transmission mechanism 150 by a lever link mechanism 130. When the driving source switching lever 70 is set in the motor driving state, the shift lock mechanism 140 locks the shift position of the transmission 110 in neutral. Thus, the driving force of the engine 10 is not transmitted to the driving shaft 111.

When the driving source switching lever 70 is set in the engine driving state, the driving force transmission mechanism 150 does not transmit a driving force of the vehicle driving motor 20 to the driving shaft 111. In this case, the transmission 110 transmits a driving force of the engine 10 to the driving shaft 111. On the other hand, when the driving source switching lever 70 is set in the motor driving state, the driving force transmission mechanism 150 transmits the driving force of the vehicle driving motor 20 to the driving shaft 111.

A rotation speed sensor 170 detects a rotation speed of a specific gear, described below, in the driving force transmission mechanism 150. A battery 180 supplies electric power to a current control circuit 160. The current control circuit 160 controls an electric current that is supplied to the vehicle driving motor 20 based on a state of the forward-backward movement operator 80 and a rotation speed detected by the rotation speed sensor 170.

A speed sensor 190 detects a rotation speed of the front wheel 2 or the rear wheel 3 of FIG. 1 to detect a traveling speed of the motorcycle 100. The traveling speed detected by the speed sensor 190 is displayed on a speedometer 191.

(3) Driving Force Transmission Mechanism 150 and Current Control Circuit 160

Figure 3:
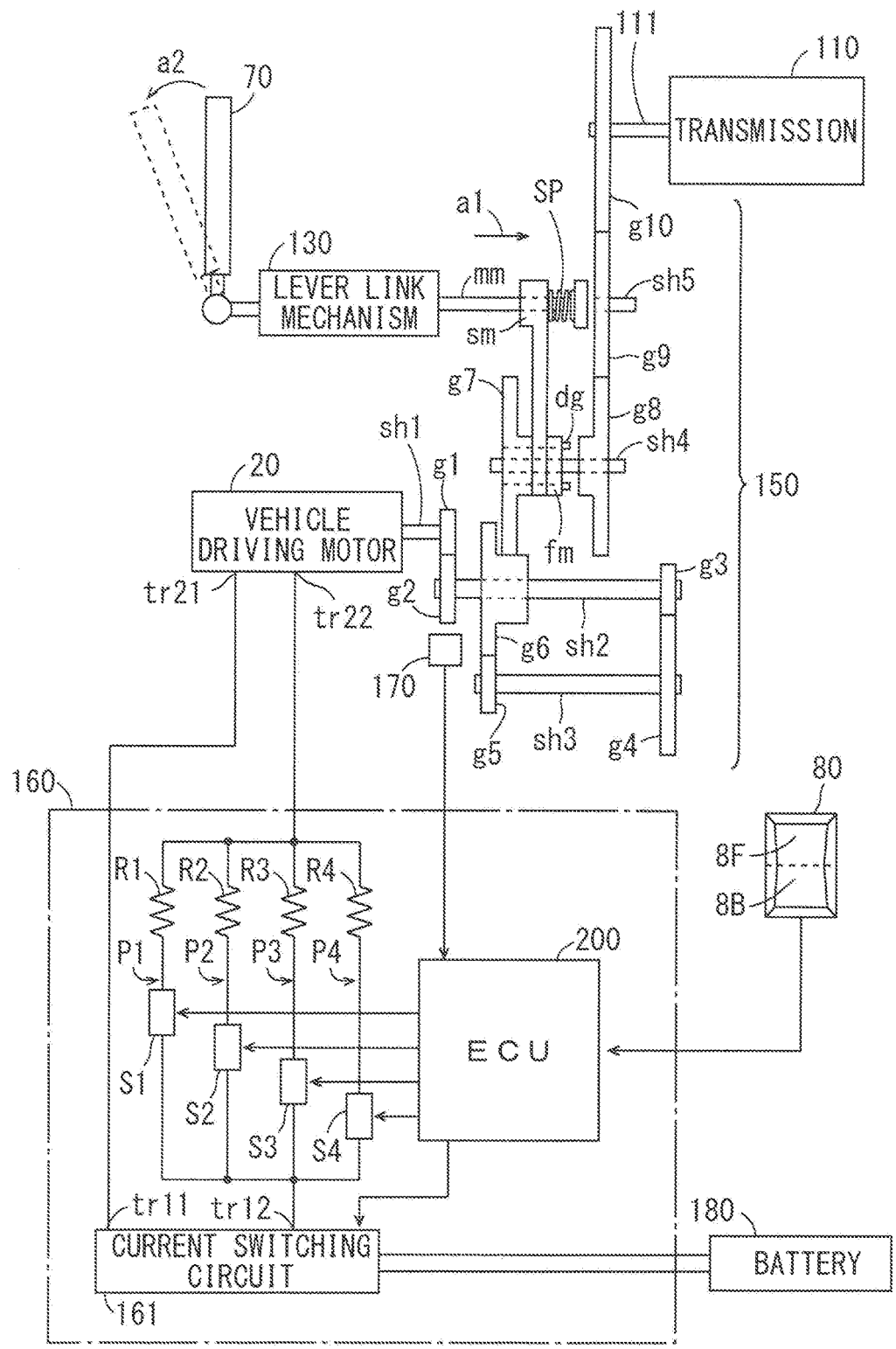
FIG. 3 is a diagram mainly showing configurations of a driving force transmission mechanism and a current control circuit of FIG. 2.

FIG. 3 is a diagram mainly showing configurations of the driving force transmission mechanism 150 and the current control circuit 160 of FIG. 2. As shown in FIG. 3, the driving force transmission mechanism 150 includes a plurality of rotation shafts sh1 to sh5, a plurality of gears g1 to g10, an engaging member fm, a movable member mm, a switching member sm and a spring sp.

The gear g1 is fixed to the rotation shaft sh1 of the vehicle driving motor 20. In the present example, the rotation shaft sh1 and the gear g1 are integrally formed as a single member. The gears g2, g3 are fixed to the rotation shaft sh2. In the present example, the rotation shaft sh2 and the gear g3 are integrally formed as a single member. The gear g1 and the gear g2 are engaged with each other. The gears g4, g5 are fixed to the rotation shaft sh3. In the present example, the rotation shaft sh3 and the gear g5 are integrally formed as a single member. The gear g3 and the gear g4 are engaged with each other. The gear g6 is provided at the rotation shaft sh2 to be rotatable relative to the rotation shaft sh2. The gear g5 and the gear g6 are engaged with each other. The gear g7 is provided at the rotation shaft sh4 to be rotatable relative to the rotation shaft sh4. The gear g6 and the gear g7 are engaged with each other.

The gear g7 is provided to be movable integrally with the switching member sm and the engaging member fm along the rotation shaft sh4. The engaging member fm has a plurality of dogs dg. Similarly to the gear g7, the gear g8 is provided at the rotation shaft sh4 to be rotatable relative to the rotation shaft sh4. In the gear g8, a plurality of recesses that can be engaged with the plurality of dogs dg of the engaging member fm are provided. The gear g9 is provided at the rotation shaft sh5 to be rotatable relative to the rotation shaft sh5. The gear g8 and the gear g9 are engaged with each other. The gear g10 is fixed to the driving shaft 111 to which the transmission 110 is connected. The gear g9 and the gear g10 are engaged with each other. The gears g1 to g10 and the rotation shafts sh1 to sh5 function as a reduction gear that decelerates a rotation speed of the vehicle driving motor 20. In the engaging member fm, an inner-diameter spline or an outer-diameter spline may be provided instead of the plurality of dogs dg. In this case, in the gear g8, an outer-diameter spline or an inner-diameter spline are provided instead of the plurality of recesses.

When the driving source switching lever 70 is in the engine driving state as indicated by solid lines, the movable member mm and the switching member sm are biased by the spring sp in an axial direction. When the driving source switching lever 70 is in the motor driving state as indicated by dotted lines, the movable member mm and the switching member sm are moved by the lever link mechanism 130 in the axis direction indicated by an arrow a1 against a biasing force of the spring sp.

Here, transmission of the driving force of the vehicle driving motor 20 will be described. A rotational force of the rotation shaft sh1 of the vehicle driving motor 20 is transmitted to the rotation shaft sh2 by the gears g1, g2, and a rotational force of the rotation shaft sh2 is transmitted to the rotation shaft sh3 by the gears g3, g4. A rotational force of the rotation shaft sh3 is transmitted to the gear g7 by the gears g5, g6.

When the driving source switching lever 70 is set in the engine driving state as indicated by the solid lines, the movable member mm and the switching member sm are biased by the spring sp. Thus, the dogs dg are not engaged with the recesses of the gear g8. When the outer-diameter spline and the inner-diameter spline are provided in the engaging member fm and the gear g8 instead of the dogs dg and the recesses, the outer-diameter spline and the inner-diameter spline are not fitted to each other. Therefore, a rotational force of the gear g7 is not transmitted to the gear g8. Therefore, the driving force of the vehicle driving motor 20 is not transmitted to the driving shaft 111.

When the driving source switching lever 70 switches to the motor driving state as indicated by an arrow a2, the movable member mm and the switching member sm move against a biasing force of the spring sp. Thus, the plurality of dogs dg of the engaging member fm are engaged with the plurality of recesses of the gear g8. When the outer-diameter spline and the inner-diameter spline are provided in the engaging member fm and the gear g8 instead of the dogs dg and the recesses, the outer-diameter spline and the inner-diameter spline are fitted to each other. As a result, a rotational force of the gear g7 is transmitted to the gear g8 and the rotation shaft sh4. A rotational force of the rotation shaft sh4 is transmitted to the rotation shaft sh5 by the gears g8, g9, and a rotational force of the rotation shaft sh5 is transmitted to the driving shaft 111 by the gears g9, g10. Therefore, a driving force of the vehicle driving motor 20 is transmitted to the driving shaft 111.

In the present embodiment, a merging portion between a driving force transmission path from the engine 10 to the rear wheel 3 and a driving force transmission path from the vehicle driving motor 20 to the rear wheel 3 is the driving shaft 111. A resolving power with which the rotation speed sensor 170 detects a high rotation speed is larger than a resolving power with which the rotation speed sensor 170 detects a low rotation speed. In the present embodiment, the rotation speed sensor 170 detects a rotation speed of the gear g2 in the reduction gear from the vehicle driving motor 20 to the driving shaft 111. Thus, when the driving shaft 111 rotates at a low speed, a high rotation speed can be detected accurately.

Next, current control of the vehicle driving motor 20 will be described. The current control circuit 160 is constituted by a plurality of resistances R1 to R4, a plurality of switches S1 to S4, a current switching circuit 161 and an ECU (Electric Control Unit) 200. The switches S1 to S4 are relays, for example. The resistances R1 to R4 are connected to the switches S1 to S4 in series, respectively. A current path P1 is constituted by the resistance R1 and the switch S1, a current path P2 is constituted by the resistance R2 and the switch S2, a current path P3 is constituted by the resistance R3 and the switch S3, and a current path P4 is constituted by the resistance R4 and the switch S4.

A terminal tr21 of the vehicle driving motor 20 is connected to a terminal tr11 of the current switching circuit 161. The current paths P1 to P4 are connected to one another to be arranged in parallel to one another between a terminal tr22 of the vehicle driving motor 20 and a terminal tr12 of the current switching circuit 161. Electric power is supplied to the current switching circuit 161 from the battery 180. The current switching circuit 161 is configured to be switchable between a short-circuit state where a portion between the terminals tr21, tr22 of the vehicle driving motor 20 is short circuited, and a release state where the portion between the terminals tr21, tr22 is released.

The rotation speed sensor 170 detects a rotation speed of the gear g2 of the driving force transmission mechanism 150. The rotation speed detected by the rotation speed sensor 170 is supplied to the ECU 200. The ECU 200 performs switching on and off of the switches S1 to S4 based on the rotation speed supplied from the rotation speed sensor 170. Thus, a current that is supplied to the vehicle driving motor 20 is controlled. A rotation speed detected by the rotation speed sensor 170 is proportional to a moving speed of the motorcycle 100 during the auxiliary moving mode.

The forward-backward movement operator 80 is operated by the rider to be in a first state or a second state. The first state corresponds to a forward movement in the auxiliary moving mode, and the second state corresponds to a backward movement in the auxiliary moving mode. The forward-backward movement operator 80 is biased to be in a neutral state between the first state and the second state. Therefore, when the rider does not operate the forward-backward movement operator 80, the forward-backward movement operator 80 maintains the neutral state.

In the present embodiment, the forward-backward movement operator 80 has a first portion 8F and a second portion 8B. The first portion 8F and the second portion 8B are arranged in a front position and a rear position in a front-and-rear direction of the vehicle, respectively. The first state is a state where the first portion 8F is depressed, and a second state is a state where the second portion 8B is depressed. The ECU 200 detects whether the forward-backward movement operator 80 is in the first state or the second state, and instructs the current switching circuit 161 to switch directions of the current based on the result of detection.

Hereinafter, a state where the first portion 8F of the forward-backward movement operator 80 is depressed is referred to as a forward movement instruction state, and a state where the second portion 8B is depressed is referred to as a backward movement instruction state.

When the first portion 8F is operated such that the forward-backward movement operator 80 is in the forward movement instruction state, the current control circuit 160 rotates the vehicle driving motor 20 in one direction such that the motorcycle 100 moves forward. When the second portion 8B is operated such that the forward-backward movement operator 80 is in the backward movement instruction state, the current control circuit 160 rotates the vehicle driving motor 20 in an opposite direction such that the motorcycle 100 moves backward.

(4) Operation in Auxiliary Moving Mode

Figure 4:
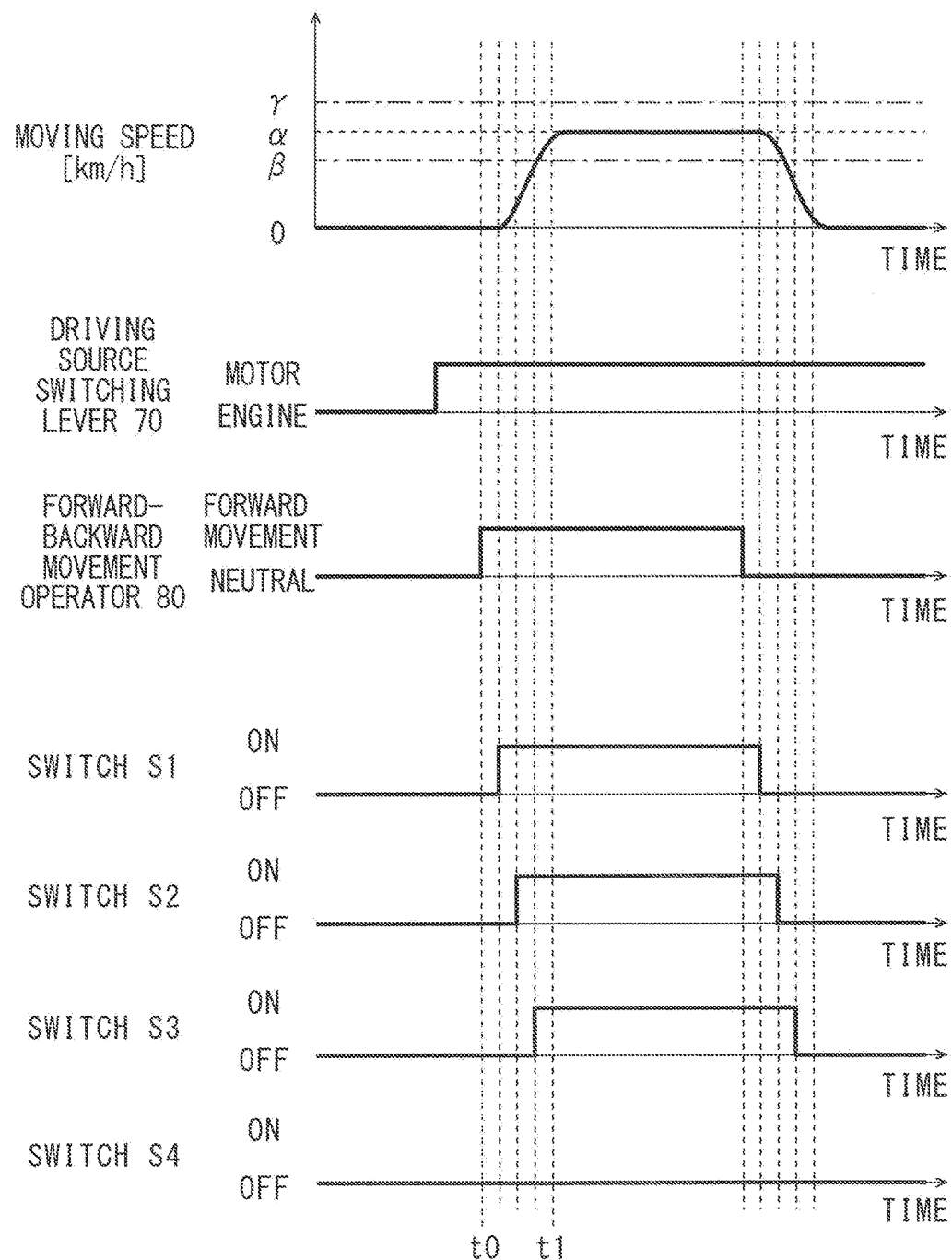
FIG. 4 is a timing chart for explaining a forward movement operation of the motorcycle on a flat surface during an auxiliary moving mode.
Figure 5:
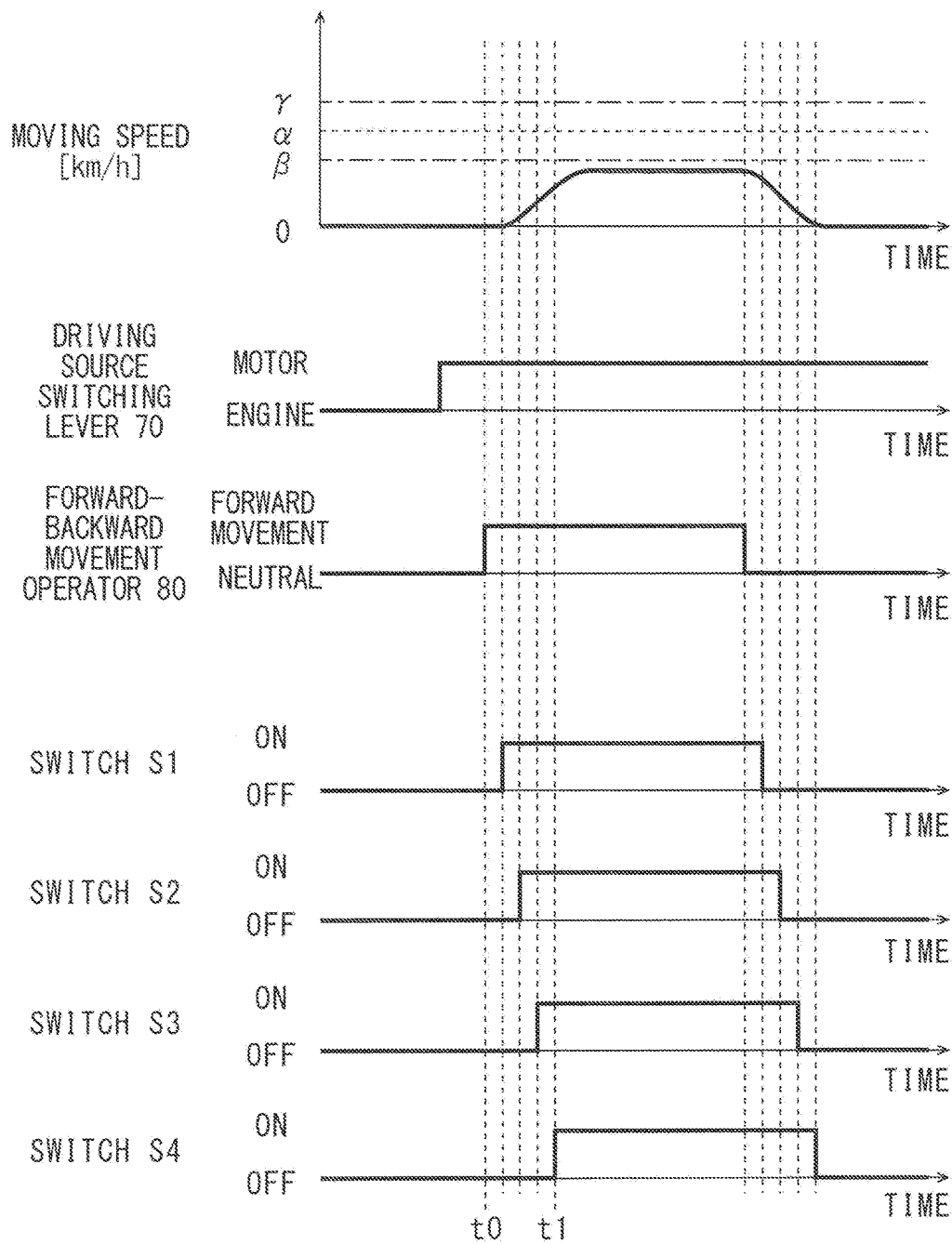
FIG. 5 is a timing chart for explaining a forward movement operation of the motorcycle on an ascending slope during the auxiliary moving mode.
Figure 6:
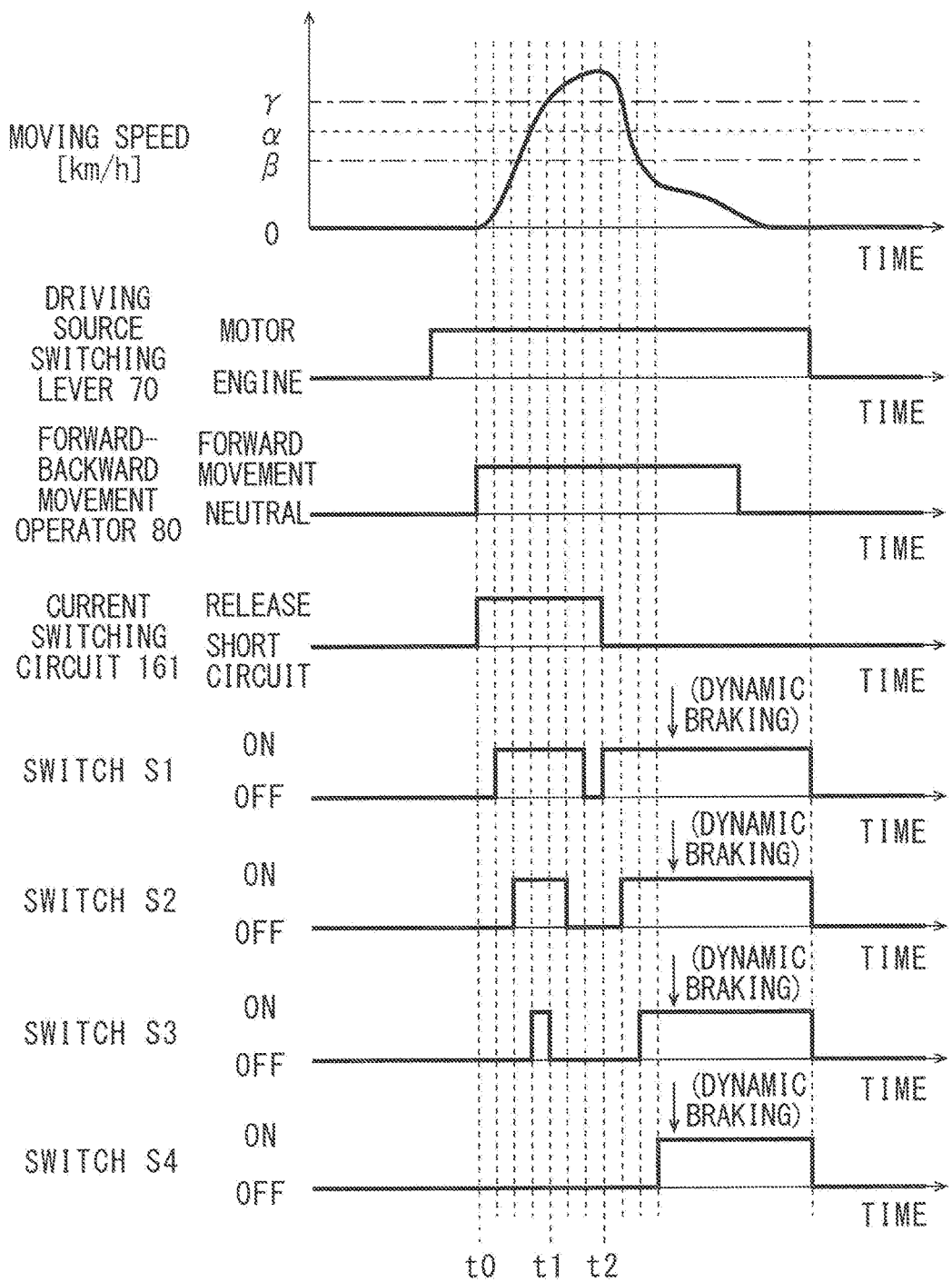
FIG. 6 is a timing chart for explaining a forward movement operation of the motorcycle on a descending slope during the auxiliary moving mode.

FIG. 4 is a timing chart for explaining a forward movement operation of the motorcycle 100 on a flat land (e.g., a flat surface) during the auxiliary moving mode. FIG. 5 is a timing chart for explaining a forward movement operation of the motorcycle 100 on an ascending slope during the auxiliary moving mode. FIG. 6 is a timing chart for explaining the forward movement operation of the motorcycle 100 on a descending slope during the auxiliary moving mode. The ascending slope means a ground that is inclined upward in a moving direction of the motorcycle 100, and a descending slope means a ground that is inclined downward in the moving direction of the motorcycle 100. FIGS. 4 to 6 show moving speeds of the motorcycle 100, states of the driving source switching lever 70, states of the forward-backward movement operator 80 and states of the switches S1 to S4. FIG. 6 further shows the short-circuit state and the release state, of the portion between the terminals tr21, tr22 of the vehicle driving motor 20, that are switched by the current switching circuit 161. The abscissas of FIGS. 4 to 6 indicate the time.

A target speed α is preset. The target speed α is preferably set equal to or lower than an average speed of a walking person. The average speed of a walking person is 4 km/h, for example. The target speed α is preferably higher than 0 km/h and not higher than 2 km/h. For example, the target speed α is 0.9 km/h. A lower limit value β that is lower than the target speed α and an upper limit value γ that is higher than the target speed α are preset.

In FIGS. 4 to 6, an engine driving state of the driving source switching lever 70 is described as "ENGINE," and the motor driving state of the driving source switching lever 70 is described as "MOTOR." Further, the forward movement instruction state of the forward-backward movement operator 80 is described as "FORWARD MOVEMENT," and the neutral state is described as "NEUTRAL." Further, an on-state of each of the switches S1 to S4 is described as "ON," and an off-state of each of the switches S1 to S4 is described as "OFF."

The ECU 200 sequentially switches on the switches S1 to S3 of the current control circuit 160. Thus, the currents flowing through the current paths P1 to P3 are supplied to the vehicle driving motor 20. As a result, the moving speed is close to the target speed α. In this case, time points at which the switches S1 to S3 are switched on are shifted from one another on a time axis. This inhibits a sudden increase of the moving speed of the motorcycle 100.

As shown in FIG. 4, in the case where the motorcycle 100 is on a flat surface, the moving speed starts to change at a time point t0 at which the forward-backward movement operator 80 is operated to be in the forward movement instruction state, and coincides with the target speed α at a time point t1 at which a certain time period has elapsed from the time point t0. Thereafter, the motorcycle 100 moves at the target speed α.

The rider operates the forward-backward movement operator 80 to cancel the forward movement instruction state, whereby the forward-backward movement operator 80 enters the neutral state, and the ECU 200 sequentially switches off the switches S1 to S3 of the current control circuit 160. Thus, the current supplied to the vehicle driving motor 20 is reduced to be 0. As a result, the moving speed decreases to 0. In this case, time points at which the switches S1 to S3 are switched off are shifted from one another on the time axis. This inhibits a sudden decrease of the moving speed of the motorcycle 100.

As shown in FIG. 5, in the case where the motorcycle 100 is on an ascending slope, the moving speed is lower than the lower limit value β during a period from the time point t0 at which the forward-backward movement operator 80 is operated to be in the forward movement instruction state to the time point t1 at which a certain time period has elapsed from the time point t0. In this case, the ECU 200 switches on the switch S4 continuously after switching on the switches S1 to S3 of the current control circuit 160. Thus, the currents that flow through the current paths P1 to P4 are supplied to the vehicle driving motor 20. As a result, the moving speed is close to the target speed α. When the rider operates the forward-backward movement operator 80 to cancel the forward movement instruction state, the forward-backward movement operator 80 enters the neutral state, and the ECU 200 sequentially switches off the switches S1 to S4 of the current control circuit 160. Thus, the current supplied to the vehicle driving motor 20 is reduced to be 0. As a result, the moving speed decreases to be 0.

The current switching circuit 161 is set in the short-circuit state when the forward-backward movement operator 80 is not operated to be in the forward movement instruction state. On the other hand, when the forward-backward movement operator 80 is operated to be in the forward movement instruction state, the current switching circuit 161 is switched from the short-circuit state to the release state.

As shown in FIG. 6, in the case where the motorcycle 100 is on a descending slope, the moving speed is equal to or higher than the upper limit value γ during the period from the time point t0 at which the forward-backward movement operator 80 is operated to be in the forward movement instruction state to the time point t1 at which a certain time period has elapsed from the time point t0. In this case, the ECU 200 sequentially switches off the switches S1 to S3 of the current control circuit 160. In the present example, the switch S3 is switched off first, and then the switch S2 is switched off. Finally, the switch S1 is switched off. Thus, with the current switching circuit 161 maintained in the release state, the current supplied to the vehicle driving motor 20 is reduced to be 0. Thereafter, in the case where the moving speed is equal to or higher than the upper limit value γ at the time point t2, the ECU 200 switches on the switches S1, S2 of the current control circuit 160, and switches the state of the current switching circuit 161 from the release state to the short-circuit state. That is, the ECU 200 short-circuits the portion between the terminals tr21, tr22 in the current switching circuit 161. Further, the ECU 200 sequentially switches on the switches S1 to S4 of the current control circuit 160. Thus, dynamic braking of the vehicle driving motor 20 is performed. As a result, the moving speed decreases to be lower than the upper limit value γ.

In this manner, when the motorcycle 100 moves on a flat surface, an ascending slope and a descending slope, the vehicle driving motor 20 is controlled such that the moving speed is close to or coincides with the target speed α.

In the above-mentioned operation, the ECU 200 may compare the rotation speed detected by the rotation speed sensor 170 to a target rotation speed corresponding to the target speed α, a lower limit rotation speed corresponding to the lower limit value β and an upper limit rotation speed corresponding to the upper limit value γ, and may control the current control circuit 160 based on a result of the comparison. Alternatively, the ECU 200 may calculate a moving speed of the motorcycle 100 from the rotation speed detected by the rotation speed sensor 170, compare the calculated moving speed to the target speed α, the lower limit value β and the upper limit value γ, and control the current control circuit 160 based on a result of the comparison.

A backward movement operation of the motorcycle 100 on a flat ground, an ascending slope and a descending slope in the auxiliary moving mode is similar to the forward movement operation of FIGS. 4 to 6 except for the rotation direction of the vehicle driving motor 20.

(5) Effects of Embodiment

During the normal traveling mode, the motorcycle 100 according to the present embodiment moves forward by the driving force generated by the engine 10 based on the operation of the rider. At this time, the traveling speed of the motorcycle 100 detected by the speed sensor 190 is presented to the rider by the speedometer 191.

During the auxiliary moving mode, the motorcycle 100 moves forward or backward by the driving force generated by the vehicle driving motor 20. Here, the rotation speed sensor 170 is provided separately from the speed sensor 190. Therefore, a resolving power of the rotation speed sensor 170 can be increased independently from a resolving power required of the speed sensor 190 during the normal traveling mode. In this case, the rotation speed that changes depending on the moving speed of the motorcycle 100 is accurately detected, and the vehicle driving motor 20 is controlled based on the detected rotation speed such that the moving speed of the motorcycle 100 is close to or coincides with the target speed α that is equal to or lower than the predetermined value. Therefore, the rider can easily perform an operation of moving the motorcycle 100 at a low speed regardless of a state of the ground such as a flat surface, an ascending slope and a descending slope.

Further, in the present embodiment, the motorcycle 100 moves at the target speed α that is equal to or lower than the average speed of a walking person during the auxiliary moving mode. Thus, the rider can easily move the motorcycle 100 forward and backward in a small space.

Further, in the present embodiment, the vehicle driving motor 20 is provided separately from the starting motor 30, at least part of the transmission path of the driving force during the normal traveling mode and at least part of the transmission path of the driving force during the auxiliary moving mode can be separated from each other. Therefore, the configuration of the driving force transmission mechanism 150 can be simplified.

Generally, the rider parks the motorcycle by kicking the ground while being seated on the seat. The speed of the vehicle that is movable when the rider seated on the seat kicks the ground with his or her feet is about 1 km/h. Therefore, the target speed α is set to about 1 km/h that is lower than 4 km/h, which is considered to be the average speed of a walking person. Thus, the motorcycle 100 can move at the speed suitable for parking. As a result, the rider can park the motorcycle 100 easily.

In the present embodiment, the rotation speed sensor 170 for detecting a low moving speed of the motorcycle 100 is used separately from the speed sensor 190 for detecting the traveling speed of the motorcycle 100. Using the above-mentioned rotation speed sensor 170, it is possible to detect the moving speed of the motorcycle 100 without being influenced by factors, which are considered to influence parking, namely, loads applied to the front wheel 2 and the rear wheel 3 of the motorcycle 100 from the road surface, the change of temperature characteristics of the vehicle driving motor 20 and the like. Therefore, it facilitates parking of the motorcycle within a constant speed range.

(6) Other Embodiments (a) In the above-mentioned embodiment, the rotation speed sensor 170, which detects the rotation speed of the specific gear g2 in the driving force transmission mechanism 150 as the physical quantity that changes depending on the moving speed of the motorcycle 100, is used. However, the physical quantity detector is not limited to the rotation speed sensor 170.

Figure 7:
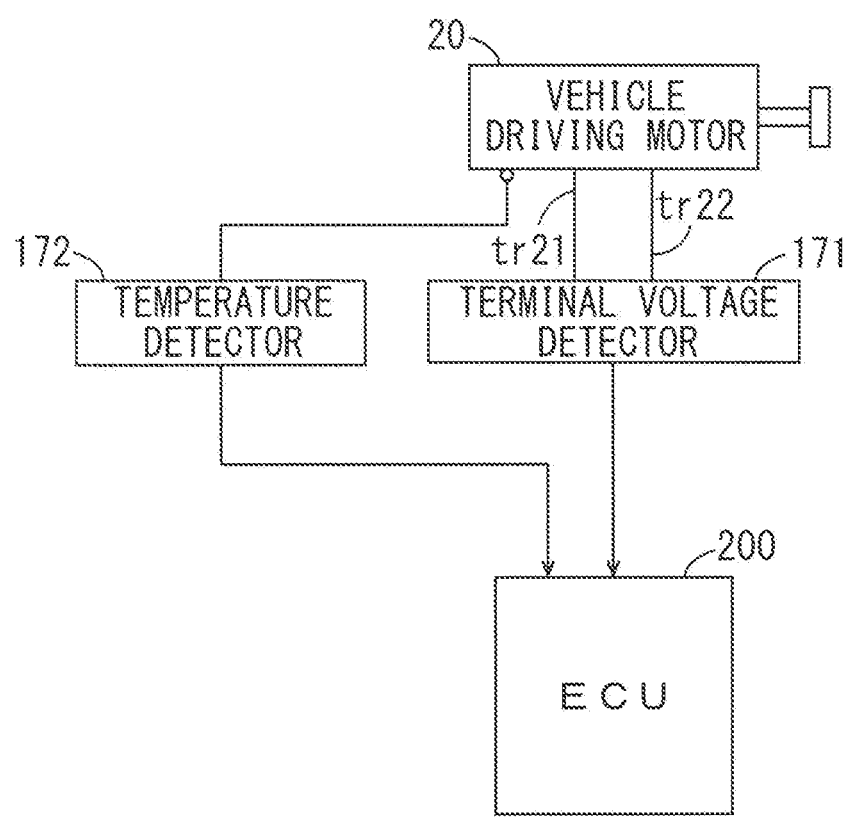
FIG. 7 is a block diagram showing another example of a physical quantity detector.

FIG. 7 is a block diagram showing another example of the physical quantity detector. In the example of FIG. 7, a terminal voltage detector 171 and a temperature detector 172 constitute the physical quantity detector. The terminal voltage detector 171 detects a voltage between the terminals tr21, tr22 of the vehicle driving motor 20 as a terminal voltage. The temperature detector 172 detects a temperature of the vehicle driving motor 20.

The vehicle driving motor 20 has temperature characteristics. Therefore, a relationship between the terminal voltage of the vehicle driving motor 20 and the rotation speed of the vehicle driving motor 20 differs depending on the temperature of the vehicle driving motor 20. As such, the ECU 200 stores a relationship among the terminal voltage, the temperature and the rotation speed of the vehicle driving motor 20 in advance.

Therefore, the ECU 200 can calculate an accurate rotation speed from the terminal voltage detected by the terminal voltage detector 171 and the temperature detected by the temperature detector 172 based on the pre-stored relationship. Further, the ECU 200 can calculate the moving speed of the motorcycle 100 based on the calculated rotation speed.

(b) In the above-mentioned embodiment, the engine 10 is used as the first driving source, and the vehicle driving motor 20 is used as the second driving source. However, the present invention is not limited to this. For example, an electric motor may be used as the first driving source. Further, the starting motor 30 may be used as the second driving source. Further, the engine may be used as the second driving source.

(c) While the rear wheel 3 is driven by the driving force of the engine 10 or the driving force of the vehicle driving motor 20 in the above-mentioned embodiment, the present invention is not limited to this. For example, the rear wheel 3 may be driven by the driving force of the engine 10, and the front wheel 2 may be driven by the driving force of the vehicle driving motor 20.

(d) The arrangement of the vehicle driving motor 20 is not limited to the arrangement in the above-mentioned embodiment. For example, the vehicle driving motor 20 may be a hub motor provided in a hub of the front wheel 2. In this case, a clutch for connecting and disconnecting a transmission path of the driving force generated by the engine 10 and a clutch for connecting and disconnecting a transmission path of the driving force generated by the vehicle driving motor 20 are provided at separate locations, and are controlled by the control device such that both clutches operate in association with each other.

(e) A common electric motor may be used as the vehicle driving motor 20 and the starting motor 30.

(f) While the above-mentioned embodiment is an example in which the present invention is applied to the motorcycle, the present invention is not limited to this. The present invention may be applied to another vehicle such as a four-wheeled automobile, a motor tricycle, an ATV (All Terrain Vehicle) or the like.

(7) Correspondences Between Constituent Elements in Claims and Parts in Embodiments In the following paragraphs, non-limiting examples of correspondences between various elements recited in the claims below and those described above with respect to various embodiments of the present invention are explained.

In the above-mentioned embodiment, the motorcycle 100 is an example of a straddled vehicle, the engine 10 is an example of a first driving source, the vehicle driving motor 20 is an example of a second driving source, the speed sensor 190 is an example of a speed detector, the speedometer 191 is an example of a speed presenter, the rotation speed sensor 170 is an example of a physical quantity detector and a rotation speed detector, the current control circuit 160 is an example of a driving controller, the driving force transmission mechanism 150 is an example of a reduction gear, and the ECU 200 is an example of a switch controller.

As each of constituent elements recited in the claims, various other elements having configurations or functions described in the claims can be also used.

While non-limiting embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A straddled vehicle comprising:
   a vehicle main body;
   a first driving source that generates a driving force for a forward movement of the vehicle main body based on an operation of a rider during a normal traveling mode;
   a second driving source, separate from a starting motor, that generates a driving force for forward and backward movements of the vehicle main body based on an operation of the rider during an auxiliary moving mode;
   a speed detector that detects a traveling speed of the vehicle main body;
   a speed presenter that presents the traveling speed detected by the speed detector to the rider;

a physical quantity detector that is provided separately from the speed detector, and detects a physical quantity that changes depending on a moving speed of the vehicle main body during the auxiliary moving mode; and a driving controller that controls the second driving source based on the physical quantity detected by the physical quantity detector during the auxiliary moving mode such that the moving speed of the vehicle main body is close to or coincides with a target speed that is equal to or lower than a predetermined value.

2. The straddled vehicle according to claim 1, wherein the predetermined value is an average speed of a walking person.

3. The straddled vehicle according to claim 1, wherein the physical quantity detector includes a rotation speed detector that detects a rotation speed of the second driving source or a rotation speed that is proportional to the rotation speed of the second driving source, and
the driving controller calculates the moving speed of the vehicle main body based on the rotation speed detected by the rotation speed detector.

4. The straddled vehicle according to claim 3, further comprising:
a drive wheel rotatably provided at the vehicle main body; and
a reduction gear that is provided in a motive power transmission path from the second driving source to the drive wheel, wherein
the rotation speed detector detects a rotation speed that is higher than a rotation speed of the drive wheel in the reduction gear.

5. The straddled vehicle according to claim 4, wherein a driving force generated by the first driving source is transmitted to the drive wheel through a motive power transmission path, and the motive power transmission path from the first driving source to the drive wheel and the motive power transmission path from the second driving source to the drive wheel have a merging portion that is connected to the drive wheel, and
the rotation speed detector detects a rotation speed of the reduction gear in a portion, from the second driving source to the merging portion, of the motive power transmission path from the second driving source to the drive wheel.

6. The straddled vehicle according to claim 1, wherein the second driving source includes an electric motor.

7. The straddled vehicle according to claim 6, wherein the driving controller includes a current control circuit that controls a current supplied to the electric motor based on a physical quantity detected by the physical quantity detector.

8. The straddled vehicle according to claim 7, wherein the current control circuit includes
a plurality of current paths connected to the electric motor,
a plurality of switches that are provided in the plurality of current paths, and
a switch controller that performs switching on and off of the switches, wherein
the switch controller controls a current supplied to the electric motor by selectively switching on or off one or a plurality of switches based on the physical quantity detected by the physical quantity detector.

9. The straddled vehicle according to claim 8, wherein the switch controller
allows a first number of switches out of the plurality of switches to be switched on when the moving speed of the vehicle main body is equal to or higher than a preset lower limit value, and
allows a second number, that is larger than the first number, of switches to be switched on when the moving speed of the vehicle main body is lower than the lower limit value.

10. The straddled vehicle according to claim 8, wherein the switch controller shifts switching time points at which the plurality of switches are switched on and off from one another on a time axis.

11. The straddled vehicle according to claim 6, wherein the driving controller allows dynamic braking of the electric motor to be performed when a moving speed calculated based on a physical quantity detected by the physical quantity detector is equal to or larger than a preset upper limit value.

* * * * *